United States Patent [19]

Tsuboi

[11] Patent Number: 4,510,820
[45] Date of Patent: Apr. 16, 1985

[54] DRUM TYPE SWITCH-OVER MECHANISM FOR A SPEED CHANGE DEVICE

[75] Inventor: Masaharu Tsuboi, Sayama, Japan

[73] Assignee: Honda Giken Kogyo Kabushiki Kaisha, Tokyo, Japan

[21] Appl. No.: 481,392

[22] Filed: Apr. 1, 1983

[30] Foreign Application Priority Data

Apr. 1, 1982 [JP] Japan .................... 57-54433

[51] Int. Cl.³ .................... G05G 1/14; F16H 1/28; F16D 41/16
[52] U.S. Cl. .................... 74/474; 74/337.5; 74/801; 74/785; 74/142; 74/475; 192/43.1
[58] Field of Search .................... 74/337.5, 801, 474, 74/142, 157, 788, 126, 785, 475; 192/43.1, 48.92, 46

[56] References Cited

U.S. PATENT DOCUMENTS

| 2,027,655 | 1/1936 | Stoeckicht | 74/801 |
| 2,744,432 | 5/1956 | Rueb | 192/43.1 X |
| 2,943,710 | 7/1960 | Lindmark | 74/157 X |
| 3,421,384 | 1/1969 | Okamota et al. | 74/337.5 X |
| 4,098,135 | 7/1978 | Werner | 74/157 |
| 4,125,032 | 11/1978 | Shuler | 74/474 X |

FOREIGN PATENT DOCUMENTS

| 2826040 | 12/1979 | Fed. Rep. of Germany | 74/474 |
| 1000180 | 2/1952 | France | 74/142 |
| 1029138 | 5/1953 | France | 74/337.5 |
| 55-106822 | 8/1980 | Japan | 74/474 |
| 56-28346 | 3/1981 | Japan | 74/475 |
| 486144 | 5/1938 | United Kingdom | 74/474 |
| 775728 | 5/1957 | United Kingdom | 74/337.5 |

Primary Examiner—Lawrence J. Staab
Assistant Examiner—Arthur T. Quiray
Attorney, Agent, or Firm—Armstrong, Nikaido, Marmelstein & Kubovcik

[57] ABSTRACT

An improved drum type switch-over mechanism for a speed change device including a speed change pedal shaft and a speed change drum both of which are rotatably supported in axial alignment with one another on a transmission case and which are operatively connected to one another by way of an intermittent feed mechanism so as to allow the speed change drum to be rotated by a unit angle in a predetermined direction on every reciprocatable rotation of the pedal shaft by a predetermined angle. The improvement consists in that the pedal shaft is located in axial alignment with an input shaft of the intermittent feed mechanism, that a sun gear is formed on the input shaft while a plurality of planet gears are mounted on the pedal shaft for meshing engagement with the sun gear, and that a ring gear meshing with the planet gears is firmly fixed to the transmission case. This arrangement of the switch-over mechanism enables the pedal shaft, the input shaft and the speed change drum to be disposed within a limited space, realizing a very compact structure of the switch-over mechanism, a substantial reduction of its mounting space and smaller design dimensions of the speed change device.

9 Claims, 10 Drawing Figures

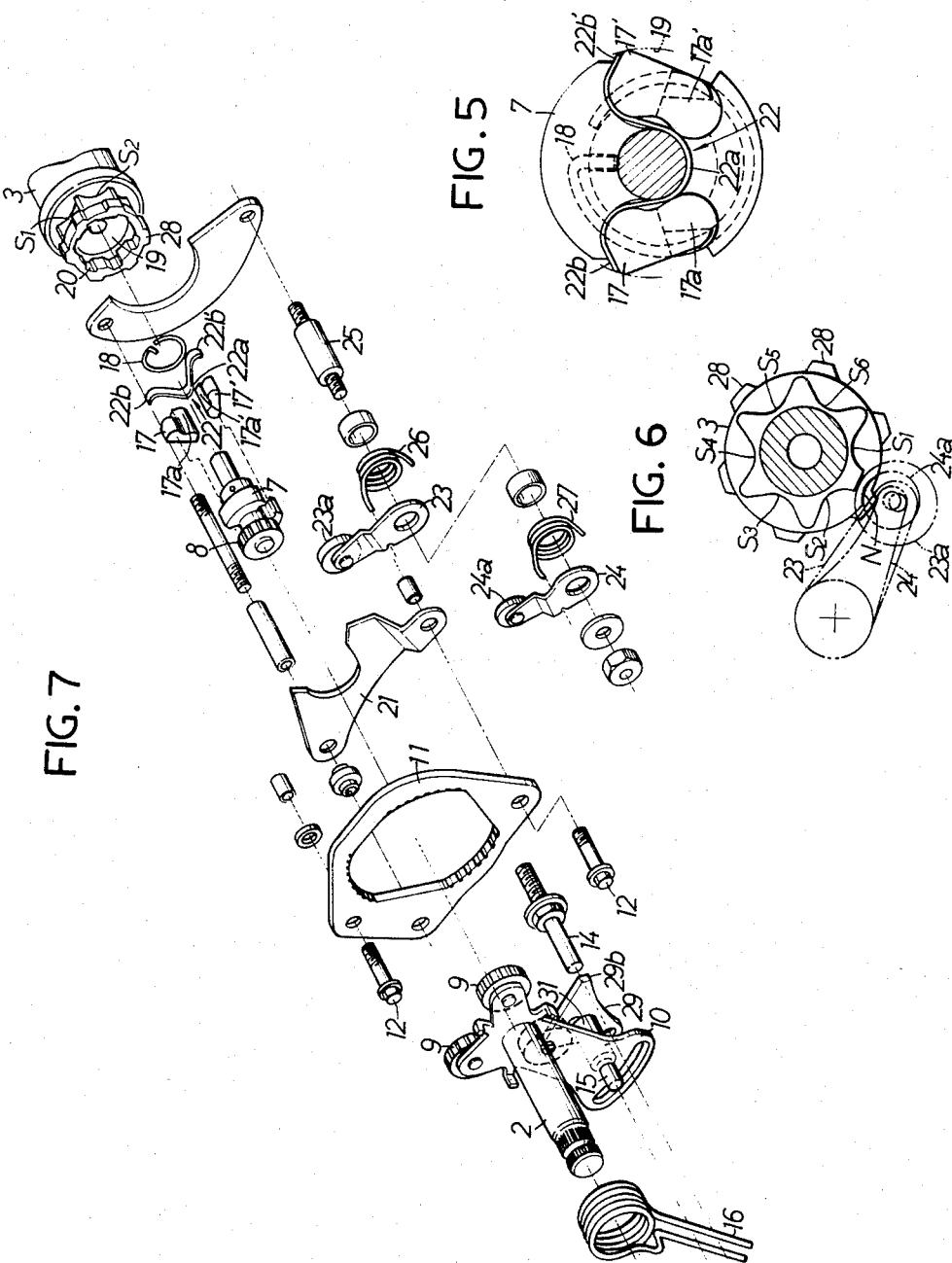

DRUM TYPE SWITCH-OVER MECHANISM FOR A SPEED CHANGE DEVICE

BACKGROUND OF THE INVENTION

1. Field of the Invention

The present invention relates to a drum type switch-over mechanism for a speed change device particularly for a motorcycle including a speed change pedal shaft and a speed change drum both of which are rotatably supported in axial alignment with one another on a transmission case such that they are operatively connected to one another by way of an intermittent feed mechanism so as to allow the speed change drum to be rotated by an unit angle in a predetermined direction on every reciprocable rotation of the pedal shaft by a predetermined angle.

2. Description of the Prior Art

A switch-over mechanism of the above-mentioned type is usually constructed from the viewpoint of maneuverability of a speed change pedal such that an angle of reciprocable rotation of the pedal shaft is determined smaller than an unit angle of rotation of the speed change drum. Due to the arrangement of the switch-over mechanism as described above there is necessity for disposing a speed-up mechanism between the pedal shaft and the intermittent feed mechanism. In general, the speed-up mechanism in the conventional switch-over mechanism is constructed by a combination of levers, sectors and the like members and therefore it has been pointed out as drawbacks inherent to such conventional switch-over mechanism that a wide distance is required between the pedal shaft and the intermittent feed mechanism and thereby the speed change drum is spaced far away from the pedal shaft, resulting in wide space being required for mounting the speed change mechanism. These drawbacks inhibit the speed change mechanism from being made compact.

SUMMARY OF THE INVENTION

Hence, the present invention has been made with the foregoing drawbacks in mind.

It is an object of the present invention to provide an improved switch-over mechanism which is capable of driving an input shaft of the intermittent feed mechanism from the pedal shaft by way of a planetary gear mechanism at a predetermined speed-up ratio while the pedal shaft and the input shaft of the intermittent feed mechanism in the speed change drum are located in axial alignment with one another.

It is another object of the present invention to provide a switch-over mechanism which is compact in structure and therefore requires a remarkably reduced space for mounting.

It is another object of the present invention to provide a switch-over mechanism which is capable of selectively determining the speed-up ratio as required irrespective of the selected space mounting.

To accomplish these objects there is proposed in accordance with the present invention a drum type switch-over mechanism for a speed change device essentially including a transmission case, a speed change pedal shaft and a speed change drum rotatably supported on the transmission case, respectively, and an intermittent feed mechanism by way of which said pedal shaft and said speed change drum are operatively connected to one another so that the speed change drum is rotated by a unit angle in a predetermined direction on every reciprocatable rotation of the pedal shaft by a predetermined angle, both the pedal shaft and the speed change drum being rotatably supported on said transmission case, wherein the pedal shaft is located in axial alignment with an input shaft of the intermittent feed mechanism, said input shaft including a sun gear formed at its outer end part which meshes with a plurality of planet gears mounted on the pedal shaft, and a ring gear meshing with said planet gears is fixedly secured to the transmission case.

Since the switch-over mechanism is constructed such that the pedal shaft, the input shaft and the speed change drum are housed in the transmission case in a very compact manner, it results that a space required for mounting can be substantially reduced and the speed change device can be designed in smaller dimensions. Another advantageous feature of the invention is that a speed-up ratio can be freely determined for the speed-up mechanism irrespective of how the space for mounting is designed, when gear ratios among the sun gear, the planet gears and the inner gear are properly selected.

Other objects, features and advantages of the present invention will be readily apparent from reading of the following description made in conjunction with a preferred embodient of the invention.

BRIEF DESCRIPTION OF THE DRAWINGS

The accompanying drawings will be briefly described below.

FIG. 5 is a sectional view of the switch-over mechanism taken in line V—V in FIG. 2, shown in an enlarged scale.

FIG. 6 is a sectional view of the switch-over mechanism taken in line VI—VI in FIG. 2, shown in an enlarged scale.

FIG. 7 is a perspective view of the switch-over mechanism in FIG. 2, shown in a disassembled state.

Now the present invention will be described in a greater detail with reference to the accompanying drawings which illustrate a preferred embodiment of the invention.

Figure 1:
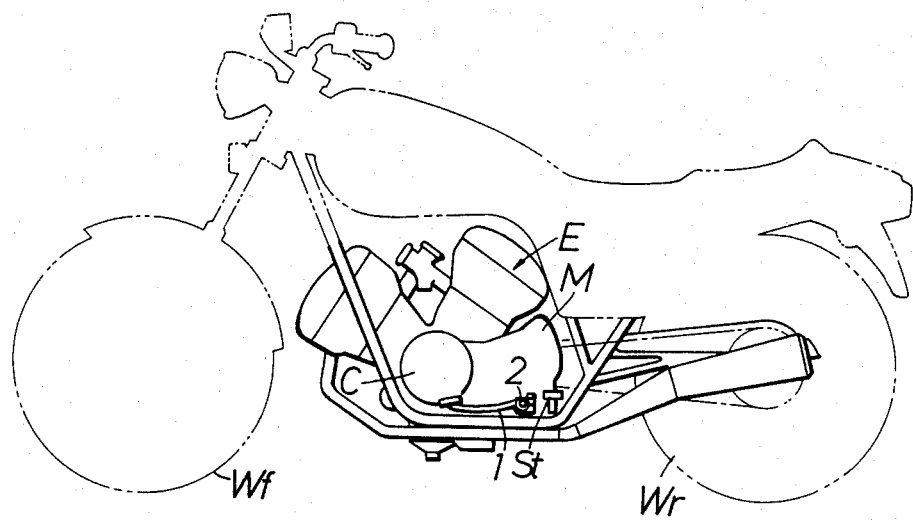
FIG. 1 is a schematic side view of a motorcar with a switch-over mechanism of the invention mounted thereon.

Referring first to FIG. 1, a motorcycle with a switch-over mechanism of the invention incorporated therein includes a front wheel $W_f$, a rear wheel $W_r$ and a V-shaped engine E disposed therebetween. The engine E has a crankcase C behind which a transmission case M is disposed in an integral relation for housing a speed change gear device. Further, a step $S_t$ and a speed change pedal 1 are arranged on the lefthand side wall of the transmission case M. The speed change pedal 1 is operated by a driver by depressing or kicking it up while his heel is placed on the step $S_t$.

Figure 2:
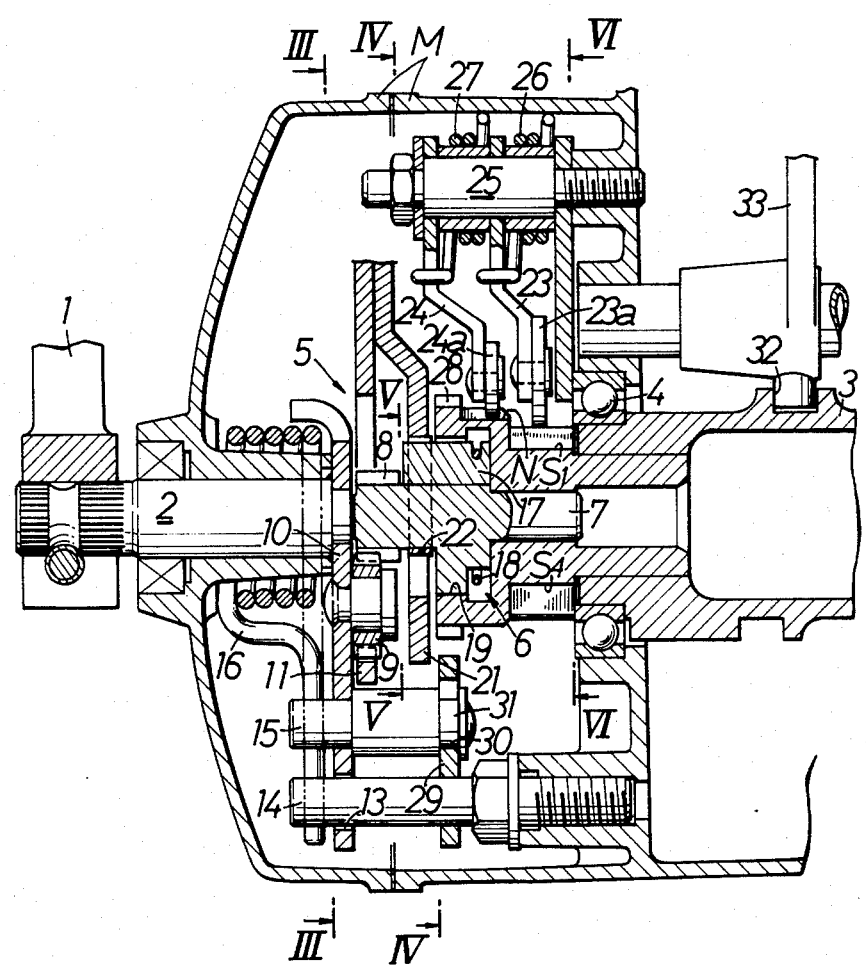
FIG. 2 is a vertical sectional view of the switch-over mechanism in accordance with an embodiment of the invention.

Next, FIG. 2 illustrates a switch-over mechanism for a six stage speed change device constructed in accordance with an embodiment of the invention. The speed change pedal 1 is fixedly mounted on the outer end part of a pedal shaft 2 rotatably supported on the transmission case M. Further, a speed change drum 3 is rotatably mounted in axial alignment with the pedal shaft 2 on the transmission case M by means of a ball bearing 4, whereas a speed-up mechanism 5 and an intermittent feed mechanism 6 are arranged in the space between the pedal shaft 2 and the speed change drum 3.

Figure 3:
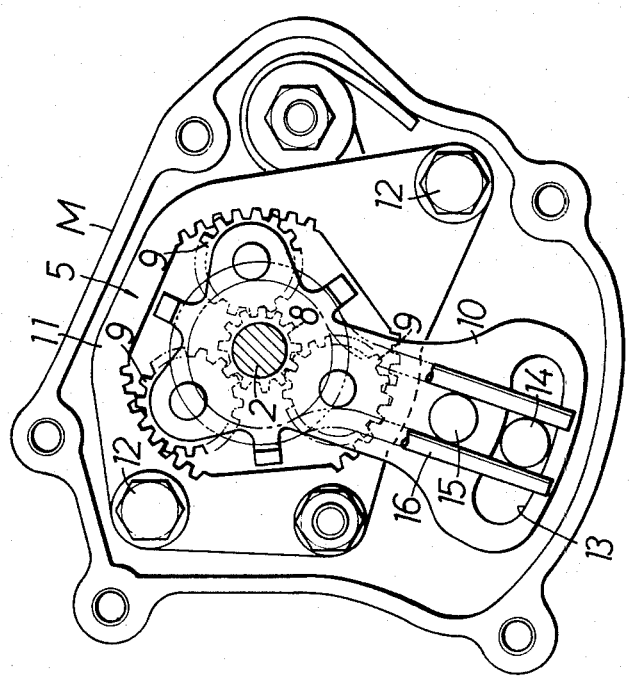
FIG. 3 is a sectional view of the switch-over mechanism taken in line III—III in FIG. 2.

As will be apparent from FIGS. 2 and 3, the speed-up mechanism 5 is constructed as a planetary gear type. Specifically, an input shaft 7 of the intermittent feed mechanism 6 is disposed in axial alignment with the pedal shaft 2 so that a sun gear 8 is formed on the outer end part of said input shaft 7. The sun gear 8 meshes with three planet gears 9 which are rotatably mounted on a shift arm 10 fixedly secured onto the pedal shaft 2, said planet gears 9 being located on the shift arm 10 in a circumferentially equally spaced relation. A ring gear 11 meshing with each of the planet gears 9 is attached to the transmission case M with the aid of bolts 12. The speed-up mechanism 5 is constructed by a combination of the above-described components.

The shift arm 10 is formed with an elongated hole 13 having an arch configuration of which the center of radius is located at the pedal shaft 2 so that a fixed pin 14 on the transmission case M is fitted into said elongated hole 13 so as to move along the latter. Thus, the swing angle of the shift arm 10, i.e., the revolution angle of the planet gears 9 is defined by abutment of the fixed pin 14 against one of the side end walls of the elongated hole 13. Since there is no necessity for allowing the planet gears 9 to rotate along the whole periphery of the ring gear 11, the ring gear 11 has a limited number of inner teeth formed only within an extent of revolution of the planet gears 9 in the illustrated embodiment. Obviously, the arrangement of the limited number of inner teeth contributes to reduction in manufacturing cost of the switch-over mechanism Further, the shift arm 10 includes a movable pin 15 which is fixedly disposed thereon in parallel to the fixed pin 14, the movable pin 15 being located on a straight line extending between both the centers of the pedal shaft 2 and the elongated hole 13. Both the pins 14 and 15 are simultaneously clamped by means of a clamp spring 16 so that they normally take a position on the aforesaid straight line to urge the shift arm 10 in its neutral position.

Figure 4:
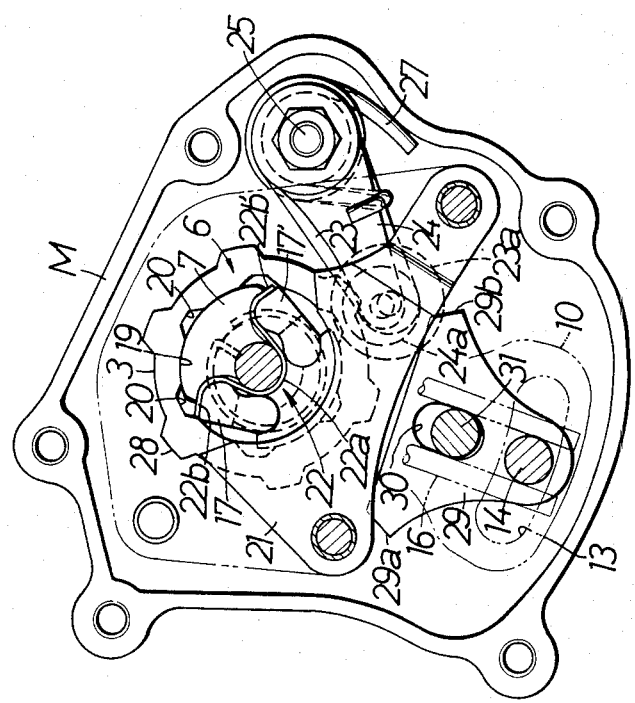
FIG. 4 is a sectional view of the switch-over mechanism taken in line IV—IV in FIG. 2.

The intermittent feed mechanism 6 is constructed as a ratchet type as illustrated in FIGS. 2, 4 and 5. Specifically, the input shaft 7 rotatably supported on the outer end part of the speed change drum 3 (which also serves as an output shaft of intermittent feed mechanism 6) includes a pair of ratchets 17 and 17′ which are disposed symmetrically relative to the input shaft 7 so as to turn outward or inward in a radial direction relative to the latter, and are adapted to rotate together with the input shaft 7. To operatively hold the ratchets 17 and 17′ on the input shaft 7 at their base portions $17_a$ and $17_a′$ an annular clip 18 is arranged so as to surround those base portions $17_a$ and $17_a′$. In addition a single leaf spring 22 is arranged so as to normally urge both the ratchets 17 and 17′ to turn radially outward under the influence of resilient force. As is best seen in FIG. 5, the leaf spring 22 comprises a U-shaped central portion $22_a$ adapted to engage with the input shaft 7 by half of the periphery of the latter and a pair of outwardly bent portions $22_b$ and $22_b′$ extending outward from the end parts of the U-shaped central portion $22_a$ in resilient engagement with the movable end parts of the ratchets 17 and 17′. Owing to the arrangement of the leaf spring 22 both the ratchets 17 and 17′ can be reliably turned outward in the radial direction. Further, it should be noted that they are very simple in structure and are easy to be fitted onto the input shaft 7.

When each of the ratchets 17 and 17′ is caused to turn outward, its outermost end part is projected outward of the outer periphery of the input shaft 7, whereas when it is caused to turn inward, its outermost end part is located below the outer periphery of the input shaft 7. The speed change drum 3 is provided with a ratchet housing 19 in which the ratchets 17 and 17′ and the input shaft 7 are accommodated and which is formed with six engagement recesses 20 equal in number to the speed change stages and into which recesses each of the ratchets 17 and 17′ is adapted to come in engagement one after another.

A part of each of the ratchets 17 and 17′ is projected outward of the side wall of the ratchet housing 19 in the axial direction and a ratchet turning plate 21 is fixedly secured to the transmission case M by means of the bolts 12 so as to alternately turn the ratchets 17 and 17′ radially inward by way of engagement of the latter with the ratchet turning plate 21.

As shown in FIGS. 2 and 6, the speed change drum 3 is formed with six speed change locating notches, i.e., first speed locating notch $S_1$ to sixth speed locating notch $S_6$ in a circumferentially equally spaced relation on the outer surface thereof and further formed on the speed change drum 3 is a neutral locating notch N at a portion adjacent to the six notches. To hold the speed change drum 3 at a required speed change position in cooperation with the speed change locating notches $S_1$ to $S_6$ a first stopper arm 23 is provided swingably on a support shaft 25 fixedly attached to the transmission case M, whereas to hold the speed change drum 3 at the neutral position in cooperation with the neutral locating notch N a second stopper arm 24 is provided also swingably on the support shaft 25. The respective stopper arms 23 and 24 carry positioning rollers $23_a$ and $24_a$ at their outer end parts of which the roller $23_a$ is adapted to come in engagement with one of the locating notches $S_1$ to $S_6$ and the roller $24_a$ with the neutral positioning notch N with the aid of springs 26 and 27, respectively. The intermittent feed mechanism 6 is constructed by a combination of the above-described components.

Further, a mechanism for inhibiting any excessive rotation of the speed change drum 3 is provided between the speed change drum 3 and the shift arm 10 in the following manner. Specifically, as shown in FIGS. 2 and 4, the speed change drum 3 has six engagement pawls 28 which are equal in number to the speed change stages and are projected outward of the outer surface of the drum 3 in a circumferentially equally spaced relation, whereas a drum holding member 29 swingably supported on the fixed pin 14 has a pair of corner portions $29_a$ and $29_b$ formed thereon for alternately coming into engagement with one of the engagement pawls 28 at the extreme ends of the swinging movement of the shift arm 10. To allow the drum holding member 29 to swing to a position where the corner portion $29_a$ or $29_b$ comes in engagement with one of the engagement pawls 28 when the shift arm 10 is swung to the extreme ends, the drum holding member 29 is operatively associated with the shift arm 10 by way of a junction pin 31 which is fitted through an elongated hole 30 formed at the middle part of the drum holding member 29, the junction pin 31 being fixed to the shift arm 10 and extending in parallel to the fixed pin 14 formed integral therewith.

In FIG. 2 reference numeral 32 designates a cam groove formed on the outer surface of the speed change drum 3 and reference numeral 33 designates a shift fork for shifting speed change gears by way of axial displacement initiated by means of the cam groove 32.

Next, operation of the above-mentioned embodiment will be described below.

Figure 3A:
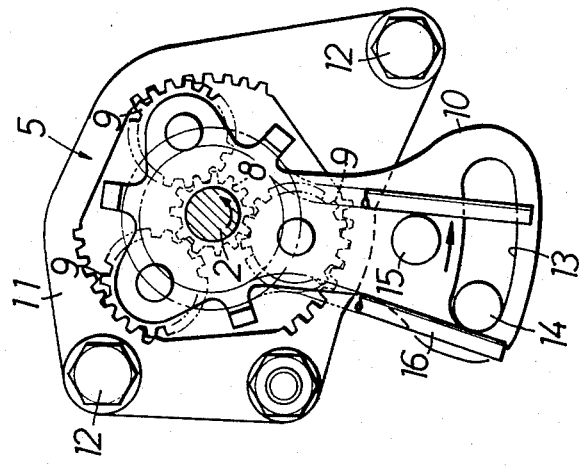
FIG. 3A is a sectional view similar to FIG. 3 illustrating that parts and components are located at the different operative position from FIG. 3.

FIG. 3 illustrates that the shift arm 10 is held in its neutral position under the clamping function effected on the fixed pin 14 and the movable pin 15 by means of the clamp spring 16. When the speed change pedal 1 is depressed with the above-described position being maintained, the pedal shaft 2 is caused to swing in the anticlockwise direction while opening the clamp spring, wherein the angle of swinging movement, i.e., the rotational angle of the pedal shaft 2 is limited within a predetermined extent by abutment of the fixed pin 14 against one of the side end walls of the elongated hole 13 as shown in FIG. 3A. The swinging movement of the shift arm 10 causes the planet gears 9 to revolve as well as to rotate along the ring teeth of the ring gear 11. As a result the sun gear 8 is caused to rotate in the same direction as that of the pedal shaft 2. Since the sun gear 8 is driven under the influences of both the revolution and rotation of the planet gears 9, it results that rotation of the pedal shaft 2 is transmitted to the sun gear 8, i.e., to the input shaft 7 of the intermittent feed mechanism 6 at an increased speed. Thus, the input shaft 7 is rotated by a predetermined unit angle (for instance, 60 degrees in the illustrated embodiment).

FIG. 4 illustrates that the speed change drum 3 is held in its neutral position. In the illustrated state the second stopper arm 24 assumes the position where the locating roller $24_a$ is brought in engagement with the neutral locating notch N, while the first stopper arm 23 assumes the position where the locating roller $23_a$ is brought in engagement with the truncated hill part intermediate the first speed locating notch $S_1$ and the second speed locating notch $S_2$. On the other hand, the ratchets 17 and 17' assume their waiting positions where their outermost end parts are located at the edges of the corresponding engagement recesses 20.

Figure 4A:
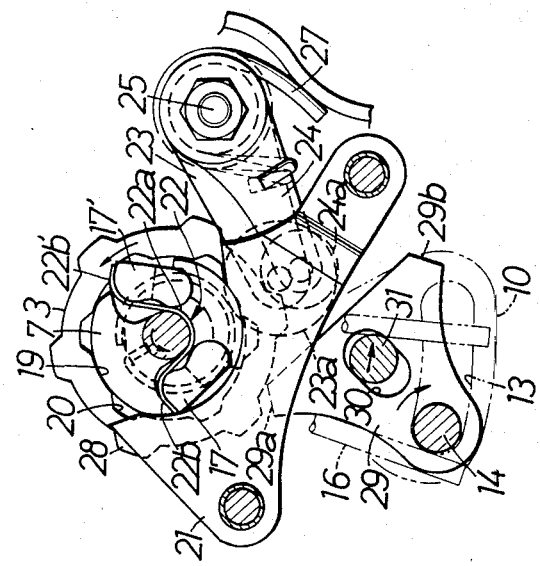
FIG. 4A is a sectional view similar to FIG. 4 illustrating that parts and components are located at the different operative position from FIG. 4.

As the input shaft 7 is rotated from the above-described positional state by depressing the speed change pedal 1, the pair of ratchets 17 and 17' are caused to rotate together with the input shaft 7 in the anticlockwise direction. When the input shaft 7 has been rotated by an angle equal to half of the predetermined unit angle(30 degrees in the illustrated embodiment), the ratchet 17' moving apart from the plate 21 is turned outward until it comes in firm engagement with the reces 20. Then, while the input shaft 7 is rotated by an angle equal to the residual half of the predetermined unit angle, the ratchet 17' is effective in rotating the speed change drum 3 by half of the predetermined unit angle in the same direction. As a result the positional state as illustrated in FIG. 4A is attained. Thus the speed change drum 3 is rotated to the first speed position and thereby the locating roller $23_a$ of the first stopper arm 23 is brought in engagement with the first speed locating notch $S_1$ at the same time when the locating roller $24_a$ of the second stopper arm 24 is released from the neutral locating notch N.

In the meantime, the other ratchet 17 is introduced into the inoperative position where it is fully turned inward by means of the ratchet turning plate 21 and therefore no engagement is established with any one of the engagement recesses 20. On the other hand, during the above-described swinging movement of the shift arm 10 the drum holding member 29 is caused to swing about the fixed pin 14 in the clockwise direction by means of the junction pin 31 until the positional state as illustrated in FIG. 4A is attained where the lefthand corner portion $29_a$ is located opposite to one of the engagement pawls 28 at a little clearance kept therebetween. Thus, when the speed change drum 3 is initiated to rotate further beyond the first speed position under the influence of rotataional inertia force thereof, the corner portion $29_a$ of the drum holding member 29 is brought in abutment against the engagement pawl 28 whereby any excessive rotation of the speed change drum 3 is inhibited by the latter. Owing to the arrangement as described above it is assured that the speed change drum 3 can be rotated to the position corresponding to the required speed stage without fail at all times.

Next, when depressing force on the speed change pedal 1 is released, the shift arm 10, the pedal shaft 2 and the speed change pedal 1 are restored to the neutral position under the influence of the clamping function of the clamp spring 16. The input shaft 7 is then rotated in the reverse direction, i.e., in the clockwise direction, by the predetermined unit angle by way of the speed-up mechanism 5 and thereby the pair of ratchets 17 and 17' are also rotated in the same direction. Thus, the ratchet 17' which has been engaged with the engagement recess 20 becomes disengaged therefrom to be turned inward and is thereafter brought in engagement with the next engagement recess 20 located closer to the ratchet turning plate 21, whereas the other ratchet 17 comes out of the ratchet turning plate 21 and thereafter is brought in engagement with the engagement recess 20 which is located at the waiting position outside of the ratchet turning plate 21. Since during this changing operation the speed change drum 3 is held at the first speed position under the influence of the holding force of the first stopper arm 23 with the locating roller $23_a$ being engaged with the first speed locating notch $S_1$, there is no fear that speed change drum 3 rotates together with the ratchet 17' by being dragged by the latter.

Next, when the input shaft 7 is rotated by an unit angle in the clockwise direction as seen in FIGS. 3 and 4 by kick-up operation of the speed change pedal 1, the ratchet 17 which has been brought in engagement with the engagement recess 20 is caused to drive and rotate the speed change drum 3 by the same unit angle. On the other hand, the ratchet 17'is turned inward by means of the plate 21 whereby the locating roller $23_a$ of the first stopper arm 23 comes in engagement with the second speed locating notch $S_2$ while the corner portion $29_b$ of the drum holding member 29 is located opposite to the engagement pawl 28 at a small clearance kept therebetween.

Thus, the speed change drum 3 is held at the second speed position.

Further, the speed change drum 3 is rotationally shifted to the third, fourth, fifth and sixth speed positions step by step by repeated kick-up operations of the speed change pedal 1. Next, when the speed change pedal 1 is repeatedly depressed, it will be obvious that the same operations are practiced only with the exception that the speech change drum 3 is rotated in the reverse direction.

Figure 8:
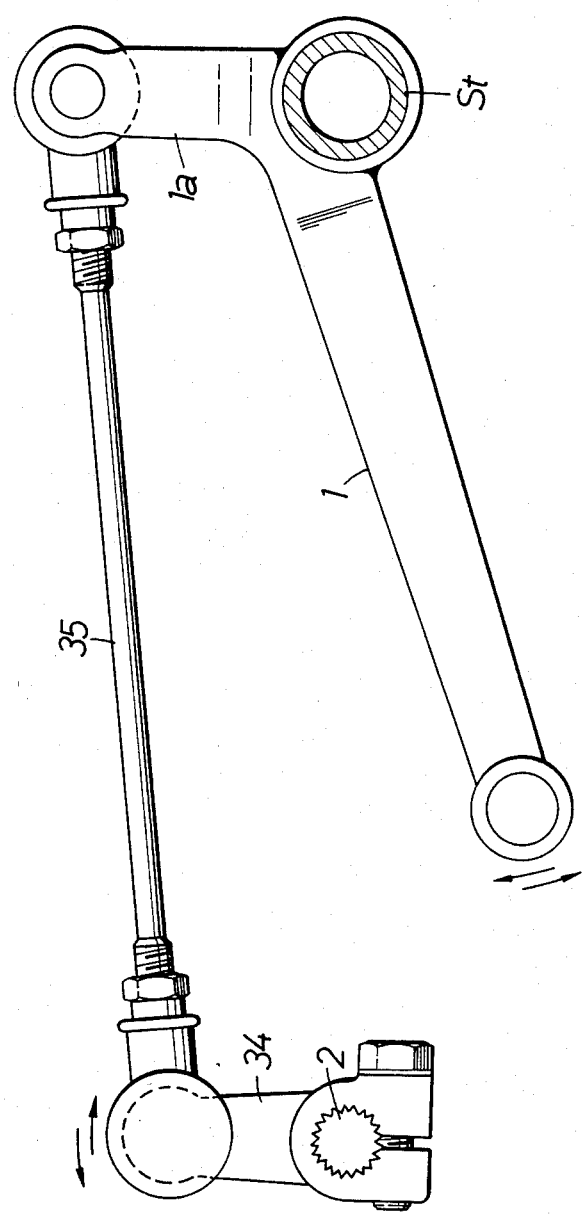
FIG. 8 is a side view of a modified actuating system for the switch-over mechanism.

Finally, FIG. 8 illustrates an actuating system for the switch-over mechanism to be used in a case where the step $S_t$ is located far behind the pedal shaft 2 which is disposed in axial alignment with the speed change drum 3 in the same manner as in the foregoing. Specifically, this actuating system is constructed such that the speed change pedal 1 has an actuating arm $1_a$ extending upward from its basal end and rotatably supported on the step $S_t$, the pedal shaft 2 located forward of the speed change pedal 1 has an actuating lever 34 fixed thereto, and the actuating arm $1_a$ and actuating lever 34 are operatively connected to one another by means of a junction link 35. Accordingly, as the speed change pedal 1 is depressed or kicked up, the pedal shaft 2 is rotated in the substantially same manner as in the foregoing through the medium of the junction link 35 and the actuating lever 34.

While the present invention has been described above merely with respect to the preferred embodiment, it should be of course understood that the present invention should be not limited only to it but it may be changed or modified in a suitable manner within the purview of the appended claims without any departure from the spirit and scope of the invention.

What is claimed is:

1. In a drum type switch-over mechanism for a speed change device comprising a transmission case, a speed change pedal shaft, a speed change drum, said speed change pedal shaft and said speed change drum being rotatably supported on the transmission case, a speed-up mechanism and an intermittent feed mechanism for operatively connecting said pedal shaft and said speed change drum together via said speed-up mechanism, the speed change drum being adapted to rotate by a unit angle in a predetermined direction on every reciprocatable rotation of the pedal shaft by a predetermined angle, the improvement wherein the pedal shaft is located in axial alignment with an input shaft of said intermittent feed mechanism, said speed-up mechanism comprises a sun gear formed on said input shaft, a plurality of planet gears mounted on said pedal shaft for meshing engagement with the sun gear, and a ring gear meshing with said planet gears and fixedly secured to the transmission case, said speed-up mechanism and said intermittent feed mechanism being disposed on different planes in the axial direction of said input shaft.

2. A drum type switch-over mechanism as defined in claim 1, wherein said intermittent feed mechanism comprises a pair of ratchets having movable end parts, respectively, and symmetrically disposed on the input shaft so as to be turned outward or inward in radial directions relative to the input shaft, a single leaf spring adapted to normally urge the ratchets to be turned outward of the input shaft, a ratchet housing disposed in an output shaft of said intermittent feed mechanism and having a plurality of engagement recesses formed on an inner wall thereof in a circumferentially equally spaced relation so as to allow the movable end parts of the ratchets to come into engagement with said recesses one after the other and a ratchet turning plate fixedly secured to the transmission case and adapted to turn the pair of ratchets inward alternately.

3. A drum type switch-over mechanism as defined in claim 2, wherein the leaf spring comprises a U-shaped central portion formed to fit the input shaft by half of its outer periphery and a pair of outwardly bent portions extending outward from both end parts of said U-shaped central portion to come into resilient engagement with the movable end parts of the ratchets in such a direction that they are normally urged in the outward direction.

4. A drum type switch-over mechanism as defined in claim 1, further comprising a shaft arm fixedly secured to the pedal shaft and having an elongated hole in an arc configuration formed thereon of which the center of radius is located on the axis of the pedal shaft said elongated holes having opposed end walls, and a fixed pin attached to the transmission case and slidably fitted into said elongated hole, an angle of swinging movement of said shift arm being an angle of revolution of the planet gears and being limited by abutment of said fixed pin against said end walls of the elongated hole.

5. A drum type switch-over mechanism as defined in claim 4, wherein said ring gear is formed with inner teeth only in areas defined by the angle of revolution of the planet gears.

6. A drum type switch-over mechanism as defined in claim 4, further comprising a mechanism for inhibiting any excessive rotation of the speed change drum, said mechanism including a plurality of engagement pawls projected outward of an outer surface of the speed change drum at a circumferentially equally spaced relation at the end part thereof, said engagement pawls being equal in number to a plurality of speed change stages, a drum holding member turnably supported on the fixed pin and having a pair of corner portions adapted to be alternately located opposite to one of the engagement pawls at limitative positions of swinging movement of the shift arm in both the directions, and a junction pin extending in parallel to the fixed pin formed integral therewith, said junction pin being slidably fitted into an elongated hole formed on the drum holding member at a middle part thereof so that the drum holding member is in operative association with the shift arm.

7. A drum type switch-over mechanism as defined in claim 1, wherein said speed change drum serves as an output shaft of said intermittent feed mechanism and has an axis in alignment with said speed change pedal shaft and said input shaft of the intermittent feed mechanism.

8. A drum type switch-over mechanism as defined in claim 1, wherein said sun gear of the speed-up mechanism and said paired ratchets of the intermittent feed mechanism are disposed on the input shaft of the intermittent feed mechanism in an axially offset relation with each other.

9. A drum type switch-over mechanism as defined in claim 1, wherein said switch-over mechanism is mounted on a motorcycle which includes a step and a speed change pedal having an actuating arm extending from a basal end thereof to be operatively connected by way of a junction rod to an actuating lever fixed to said speed change pedal shaft.

* * * * *